(12) United States Patent
Szigeti et al.

(10) Patent No.: US 12,107,830 B2
(45) Date of Patent: Oct. 1, 2024

(54) DATA COMPLIANCE METADATA MARKING

(71) Applicant: Cisco Technology, Inc., San Jose, CA (US)

(72) Inventors: Thomas Szigeti, Vancouver (CA); David John Zacks, Vancouver (CA); Walter T. Hulick, Jr., Pearland, TX (US); Rachana Anubhav Soni, San Ramon, CA (US); Hemamalini Subash, Alviso, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 224 days.

(21) Appl. No.: 17/900,516

(22) Filed: Aug. 31, 2022

(65) Prior Publication Data

US 2024/0073186 A1    Feb. 29, 2024

(51) Int. Cl.
*H04L 9/40* (2022.01)
*H04L 69/22* (2022.01)

(52) U.S. Cl.
CPC .......... *H04L 63/0245* (2013.01); *H04L 69/22* (2013.01)

(58) Field of Classification Search
CPC ............................ H04L 69/22; H04L 63/0245
USPC .......................................................... 726/13
See application file for complete search history.

(56) References Cited

U.S. PATENT DOCUMENTS

| 10,637,906 | B2 | 4/2020 | Hulick, Jr. et al. |
| 11,283,856 | B2 | 3/2022 | Hulick, Jr. et al. |
| 2007/0280112 | A1 | 12/2007 | Zheng et al. |
| 2009/0290492 | A1* | 11/2009 | Wood ............. H04L 67/568 370/235 |
| 2012/0207041 | A1 | 8/2012 | Piernot et al. |
| 2019/0190770 | A1 | 6/2019 | Garg et al. |
| 2020/0099599 | A1* | 3/2020 | Yuan ............. H04L 12/4645 |
| 2022/0050902 | A1 | 2/2022 | Hulick, Jr. |
| 2022/0060421 | A1 | 2/2022 | Reshef et al. |
| 2023/0164148 | A1* | 5/2023 | Narayan ........... H04L 63/1408 726/13 |
| 2024/0144141 | A1* | 5/2024 | Cella ............. G06Q 10/06375 |

FOREIGN PATENT DOCUMENTS

WO    WO-2024095046 A1 *  5/2024

\* cited by examiner

*Primary Examiner* — Hee Soo Kim

(74) *Attorney, Agent, or Firm* — Edell, Shapiro & Finnan, LLC

(57) ABSTRACT

A method is provided that is performed using an application performance management agent running on an application and/or application microservices. The method comprises detecting a request to the application and/or application microservices for data, and inserting data compliance metadata into packet headers of packets that are to be sent in response to the request by the application and/or application microservices. The data compliance metadata comprises data-compliance markings associated with the data based on user/operator-defined data compliance requirements. The method further includes causing the packets to be sent into a network so that one or more network devices or services in the network can read the data compliance metadata and apply packet handling policies.

20 Claims, 9 Drawing Sheets

| EMPLOYEE DATA | PII | CONFIDENTIAL | COMPANY-SPECIFIC | REGION-SPECIFIC |
|---|---|---|---|---|
| EMPLOYEE ID NUMBER | ☐ | ✓ | ✓ | ☐ |
| EMPLOYEE NAME | ✓ | ☐ | ✓ | ✓ |
| EMPLOYEE TITLE | ☐ | ☐ | ✓ | ☐ |
| DEPARTMENT | ☐ | ☐ | ✓ | ☐ |
| WORK LOCATION | ☐ | ☐ | ✓ | ✓ |
| WORK CONTACT DETAILS | ✓ | ✓ | ✓ | ✓ |
| HOME LOCATION | ✓ | ✓ | ☐ | ✓ |
| PERSONAL CONTACT DETAILS | ✓ | ✓ | ☐ | ✓ |
| EMERGENCY CONTACT | ☐ | ✓ | ✓ | ✓ |
| SALARY | ☐ | ✓ | ✓ | ☐ |
| PERFORMANCE REVIEWS | ☐ | ✓ | ✓ | ☐ |

OPERATOR CHECKS BOX(es) TO INDICATE DATA COMPLIANCE REQUIREMENT(S)

FIG.1

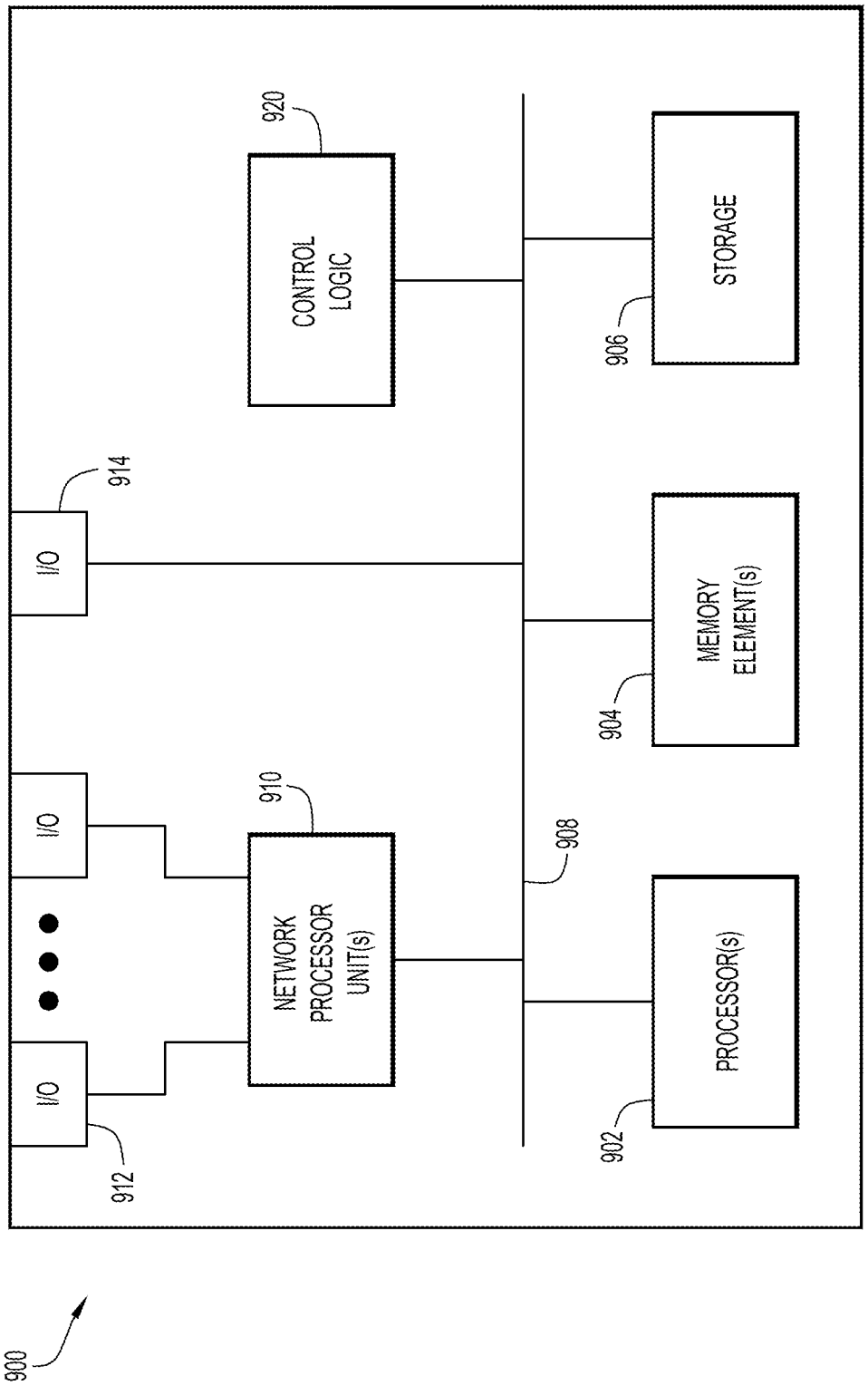

DATA COMPLIANCE METADATA MARKING

TECHNICAL FIELD

The present disclosure relates to data communication.

BACKGROUND

Larger multi-national organizations and enterprises need to adhere to data compliance regulations in the countries and geographic regions where they operate. Meeting such data compliance requirements necessitates specific network routing, path-selection and treatment policies to be enforced. However, the network infrastructure is neither privy to the kind of data that is encapsulated within the packets traversing it (as the data payloads would, in almost every case, be encrypted), nor would the network be aware of the compliance requirements of the data.

BRIEF DESCRIPTION OF THE DRAWINGS

FIG. 1 is a diagram showing an example of how different data compliance requirements can be set for data for use in generating data compliance metadata for the data, according to an example embodiment.

FIG. 9 is a hardware block diagram of a device that may be configured to perform the operations of the techniques presented herein, according to an example embodiment.

DETAILED DESCRIPTION

Overview

Figure 2:
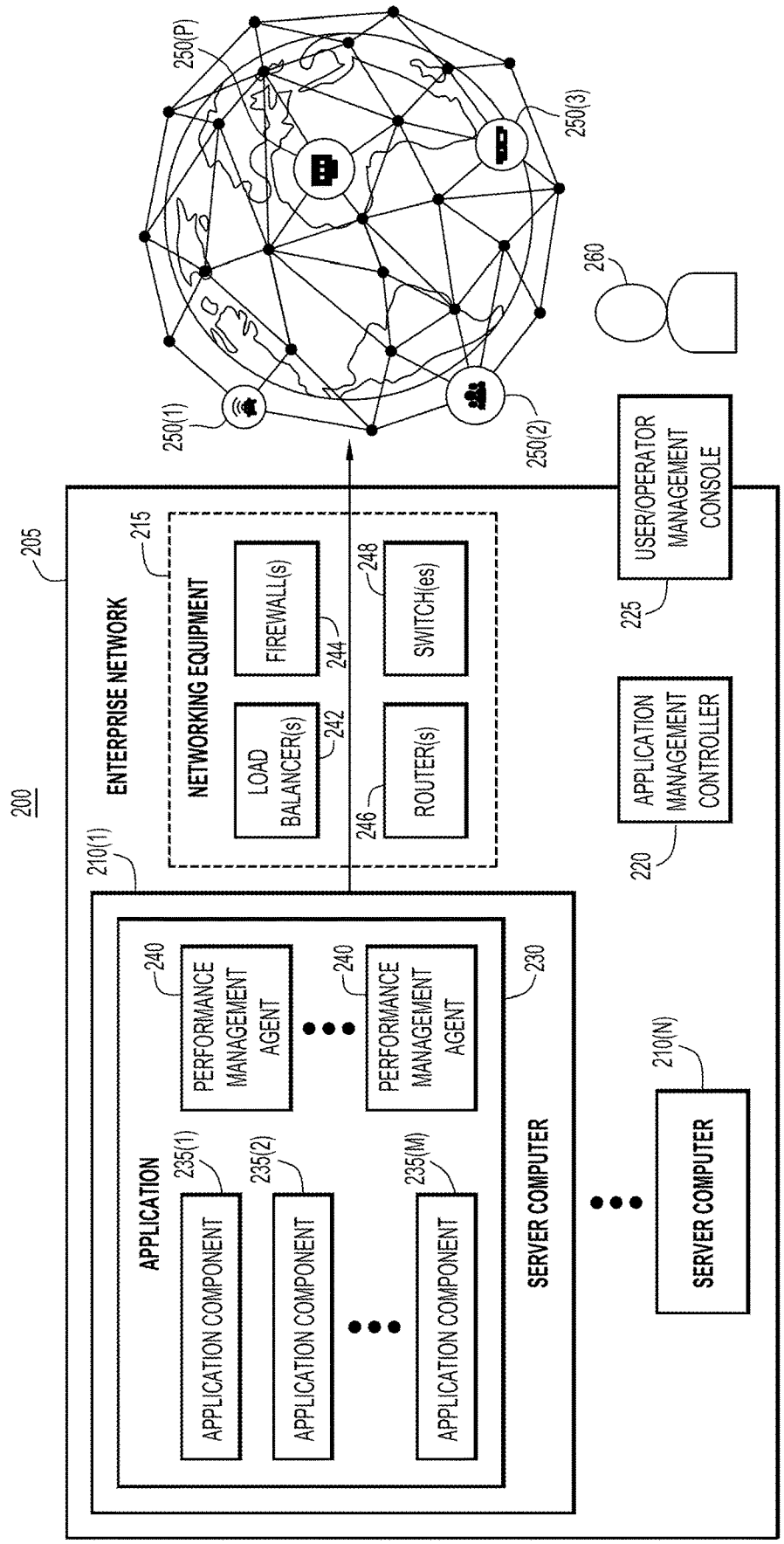
FIG. 2 is a block diagram of a system in which the functional steps of identification, marking and policy-enforcement may be performed, according to an example embodiment.

In one embodiment, a method is provided that is performed using an application performance management agent running on an application and/or application microservices. The method comprises detecting a request to the application and/or application microservices for data, and inserting data compliance metadata into packet headers of packets that are to be sent in response to the request by the application and/or application microservices. The data compliance metadata comprises data-compliance markings associated with the data based on user/operator-defined data compliance requirements. The method further includes causing the packets to be sent into a network so that one or more network devices or services in the network can read the data compliance metadata and apply packet handling policies.

Example Embodiments

Data compliance as the data packets travel from one location to another through networking equipment, creates ephemeral but nevertheless important challenges. These challenges include how to accurately identify data compliance requirements, and how to effectively and efficiently convey these requirements to the network, so that network policies on the network equipment and software can be enabled to meet these requirements.

To this end, an application performance management agent running on the server side of an application and/or in application microservices is leveraged to observe details of the individual transactions with the application, including any data requests, within the application, and in so doing providing visibility into:

Who is the user?
What is the user's role?
What type data is being accessed?
What specific values of data being returned?
What database elements are being viewed/added/changed/deleted?

Additionally, the application performance management agent may be configured to support specific custom actions to be taken, depending on business requirements. For example, an application administrator or a member of the data compliance office for an enterprise could be presented with data-tagging options from within the application performance management agent for a given application to indicate the data compliance requirements that apply to data served by the given application. Often, an application administrator or similar personnel in an organization would be in a suitable position to assess the data in relation to the data compliance requirements and policies of the organization, as those persons are intimately familiar with the business functions of the application and the data.

Consider a simplified use case, such as a human resources (HR) application. There could be several types of data accessed within the HR database, with different levels of privacy, confidentiality and other specific requirements, as shown in FIG. 1 in the example user interface (UI) schema 100 shown in FIG. 1. For example, the UI schema 100 includes different types or categories of Employee Data 110, including Employee ID number, Employ Name, Employee Title, etc., as shown in FIG. 1. Each of these types of Employee Data 110 may have a different level(s) or requirement(s) for data compliance, such as Personal Identifiable Information (PII) at 120, Confidential 122, Company-Specific 124, and Region-Specific 124. An Employee ID number may be deemed Confidential with Company-Specific requirements, whereas an Employee Name, Home Location, Personal Contact Details, and Emergency Contact would be deemed PII, Confidential with Region-Specific requirements.

The UI schema 100 further includes check boxes 130 or other similar UI elements that an operator may check to indicate the various data compliance requirements for different types of data. In the example of FIG. 1, there are check boxes 130 for each of PII 120, Confidential 122, Company-Specific 124 and Region-Specific 126.

Once the operator has checked the relevant boxes to describe the data, the application performance management agent adds metadata descriptors or markings, based on the data compliance requirements entered by an administrator user, to header(s) of data packets that will transport the data across one or more networks.

Reference is now made to FIG. 2. FIG. 2 is a block diagram of a system 200 in which the functional steps of identification, marking and policy-enforcement may be performed. The system 200 comprises an enterprise network (data center) 205 that includes one or more server computers 210(1)-210(N), networking equipment 215, an application management controller 220 and a user/operator management console 225. Each server computer 210(1)-210(N), or combinations of server computers, may execute an application. For example, server computer 210(1) executes an application 230. The application 230 may comprise a plurality of application components or application microservices 235(1)-235(M). There is at least one performance management agent 240, and in some cases a performance application agent associated with each application component or microservice 235(1)-235(M).

Network traffic in the form of flows of data packets may ingress and egress the enterprise network 205 via the networking equipment 215. The networking equipment 215 may include one or more load balancers 242 and one or more firewalls 244, for example, but may also include one or more routers 246, one or more switches 248, gateways (not shown), wireless local area network access points (not shown), etc.

FIG. 2 shows that the data packets may be sent to any one of a plurality of global network locations 250(1)-250(P) where certain actions may be taken. As described further below, the data packets are appended with metadata that includes data-compliance markings that can be read by network devices managed by the enterprise to enforce regional and/or organizational-specific data compliance requirements as defined by packet handling policies that may include including routing, access-control, inspection, etc. For example, a network location 250(1) that involves wireless networking equipment (e.g., wireless local area network access points), certain policies may be applied to prevent certain types of data from being included in packets that are to be wireless transmitted, to minimize risk of exposure to interception of the data in over-the-air transmissions. At network location 250(2), some data may be subjected to increased observation and/or inspection policies due to sensitivity of the data (additional intrusions detection/ intrusion prevention or other deep-packet inspection processes. At network location 250(3), the packets may be subject to observation by an entity. At network location 250(P), the data is allowed to be stored and/or copied and/or processed according to the data compliance policy of the given geographic area; this is another example of a data compliance policy enforced at a particular geographic location.

Still referring to FIG. 2, a user/operator 260 for the enterprise network 205 defines the various data-compliance levels and requirements (akin to the concepts presented in FIG. 1) to data that may be requested from the application 230. The user/operator 260 may enter these data-compliance levels and requirements via the operator management console 225, which in turn communicates, via the application management controller 220, with the performance management agent(s) 240 running on the application 230 or on the application components 235(1)-235(M).

The performance management agent(s) 240 detect a request for operator-defined sensitive data and insert corresponding metadata into packet headers to describe the compliance requirements of the data within the packets. There are several ways that the metadata may be inserted, as described below. The packet header data-compliance metadata markings are preserved as the data packets traverse the networking equipment 215 (e.g., one or more load balancers 242 and one or more firewalls 244) and depart the enterprise network 205 to one or more external destinations through various intermediate network locations, potentially around the world. The data compliance metadata included in the packet headers can be read by network devices managed by the enterprise to enforce packet handling policies that may include regional and/or organizational-specific data compliance requirements.

An application performance management (telemetry) agent 240 is primarily used to generate application performance telemetry. Using it to detect and mark packets that have unique data-compliance requirements is not heretofore known. This new use of an application performance management (telemetry) agent (in combination techniques for embedding data compliance markings described below) allows for existing network infrastructure to enforce routing, security and treatment policies to meet data compliance requirements without requiring new functionality of these network devices. As such, this is a significant and new outcome, since currently such network devices are generally unaware of the data compliance requirements of the packets traversing them (as virtually all such data would be encrypted).

Further still, the use of an application performance management (telemetry) agent and the network devices as described herein provides a combination of complimentary functions from different layers in the technology stack. Specifically, while application performance management platforms have visibility into data requests from the application runtime environment, these (by themselves) cannot enforce network policies to conform to data compliance requirements. On the other hand, network devices do not have visibility into data being carried in packet payloads, but do have the capability of enforcing data compliance policies, provided that they can interpret packet header metadata that conveys these requirements (and virtually all network devices can enforce policies based on Internet Protocol (IP) Type of service (ToS) byte markings described below).

Figure 3:
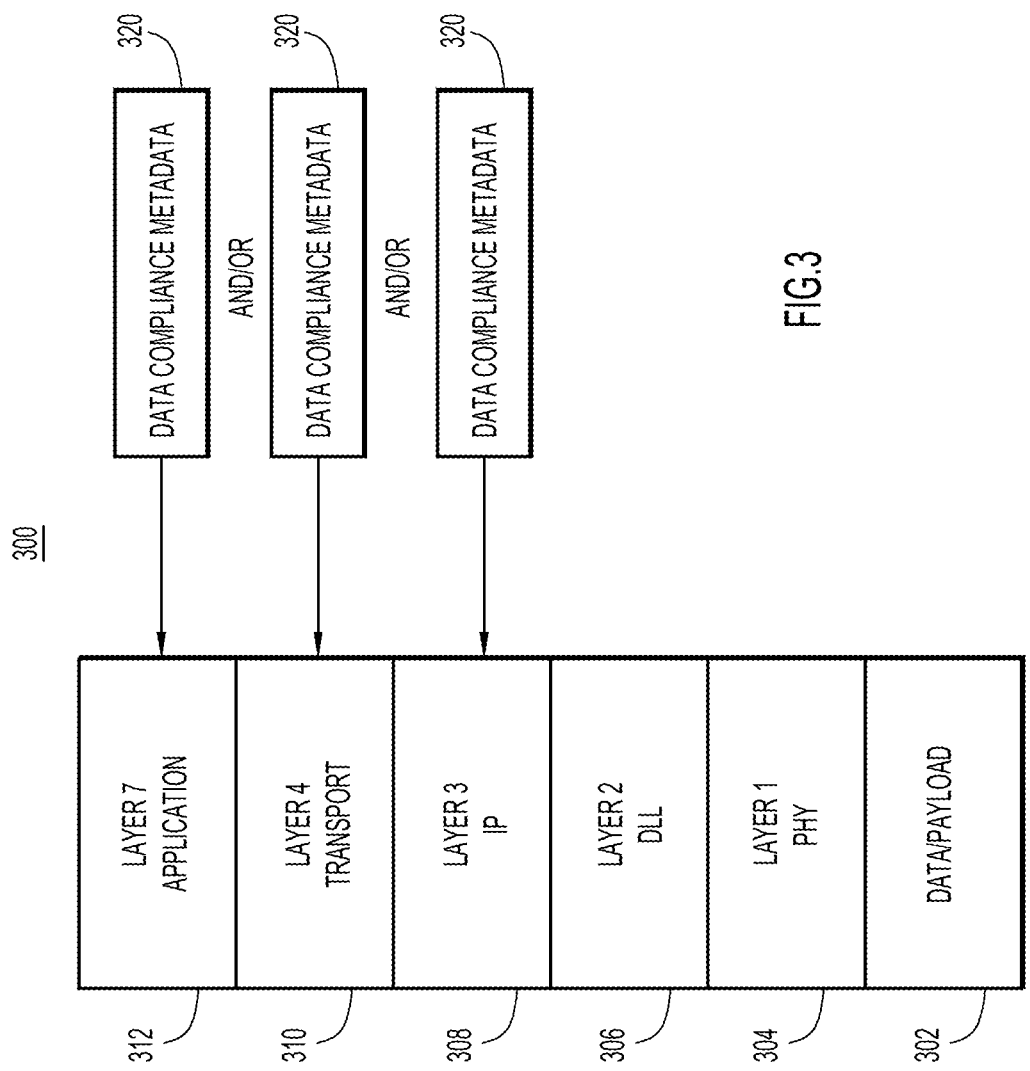
FIG. 3 depicts several methods to by which a performance management agent may embed data compliance metadata into packet headers, according to an example embodiment.

There are several options to embed data compliance metadata into packet headers, as outlined in the embodiments below; these options may be used independently or in combination with each other, as illustrated in FIG. 3. As depicted in FIG. 3, a data packet 300 includes data/payload 302, a Layer 1 (PHY) header 304, a Layer 2 (Data Link Layer) header 306, a Layer 3 (Internet Protocol) header 308, a Layer 4 (Transport) header 310 and a Layer 7 (Application) header 312. The data compliance metadata 320 for the data packet 300 may be inserted in one or any combination of the Layer 3 header 308, Layer 4 header 310 and Layer 7 header 312. The following present examples how such data compliance metadata can be expressed within Layer 3, Layer 4 and Layer 7 packet headers.

Figure 4:
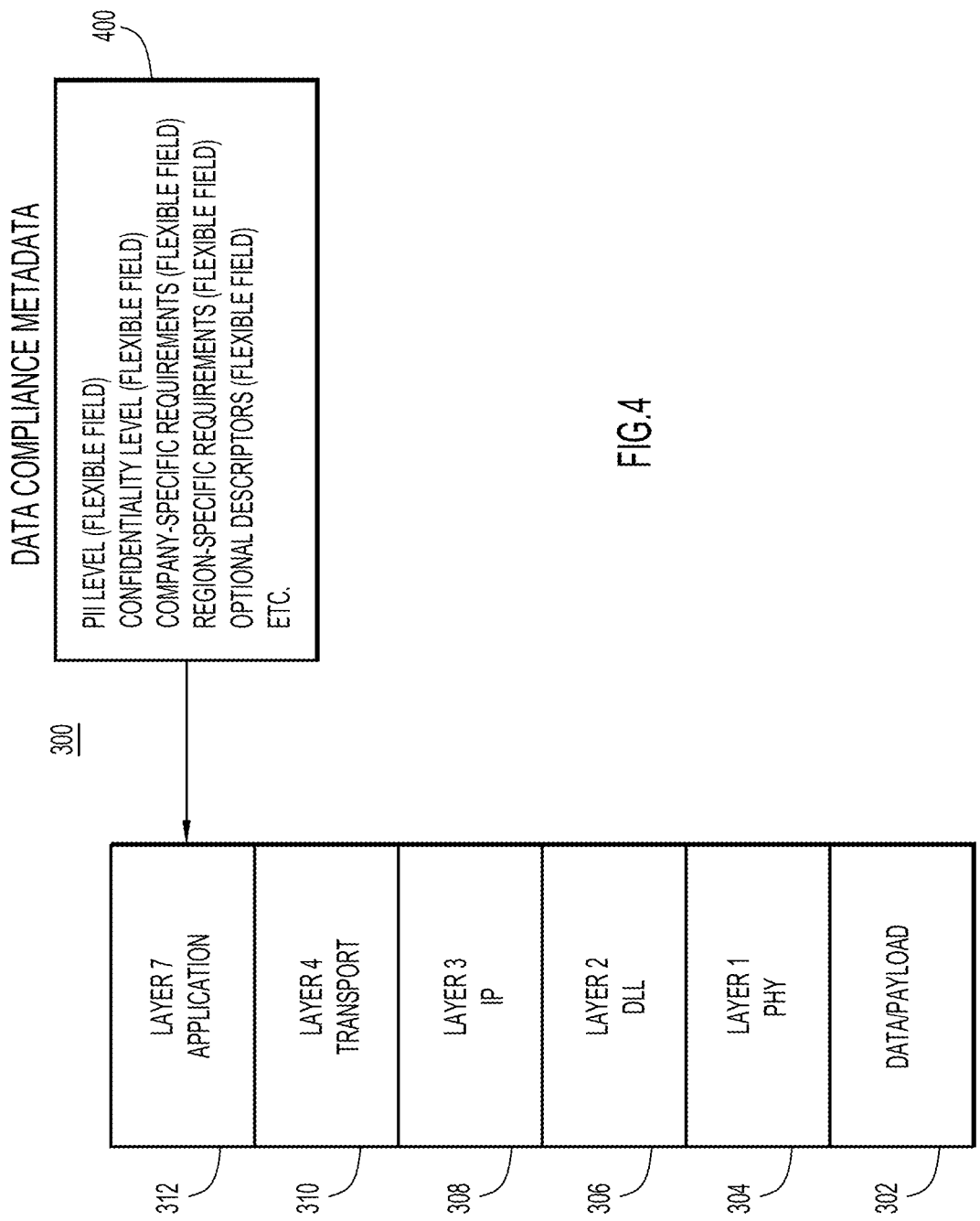
FIG. 4 illustrates how a performance management agent may add data compliance metadata into Hypertext Transfer Protocol (HTTP) headers in a Layer 7 header, according to an example embodiment.

In one embodiment, the performance management agent may add data compliance metadata 400 into Hypertext Transfer Protocol (HTTP) headers in the Layer 7 header 312, as shown in FIG. 4. This is a flexible and extensible option for embedding data compliance metadata into network protocol headers.

HTTP is typically encrypted, and as such, any metadata encrypted within such headers would (like the data payloads themselves) be opaque to network infrastructure devices tasked with implementing data compliance policies. Finally, such metadata would not be preserved if the packets were tunneled via overlay infrastructures (like SD-WAN, SD-Access, VPN tunnels, etc.)

Figure 5:
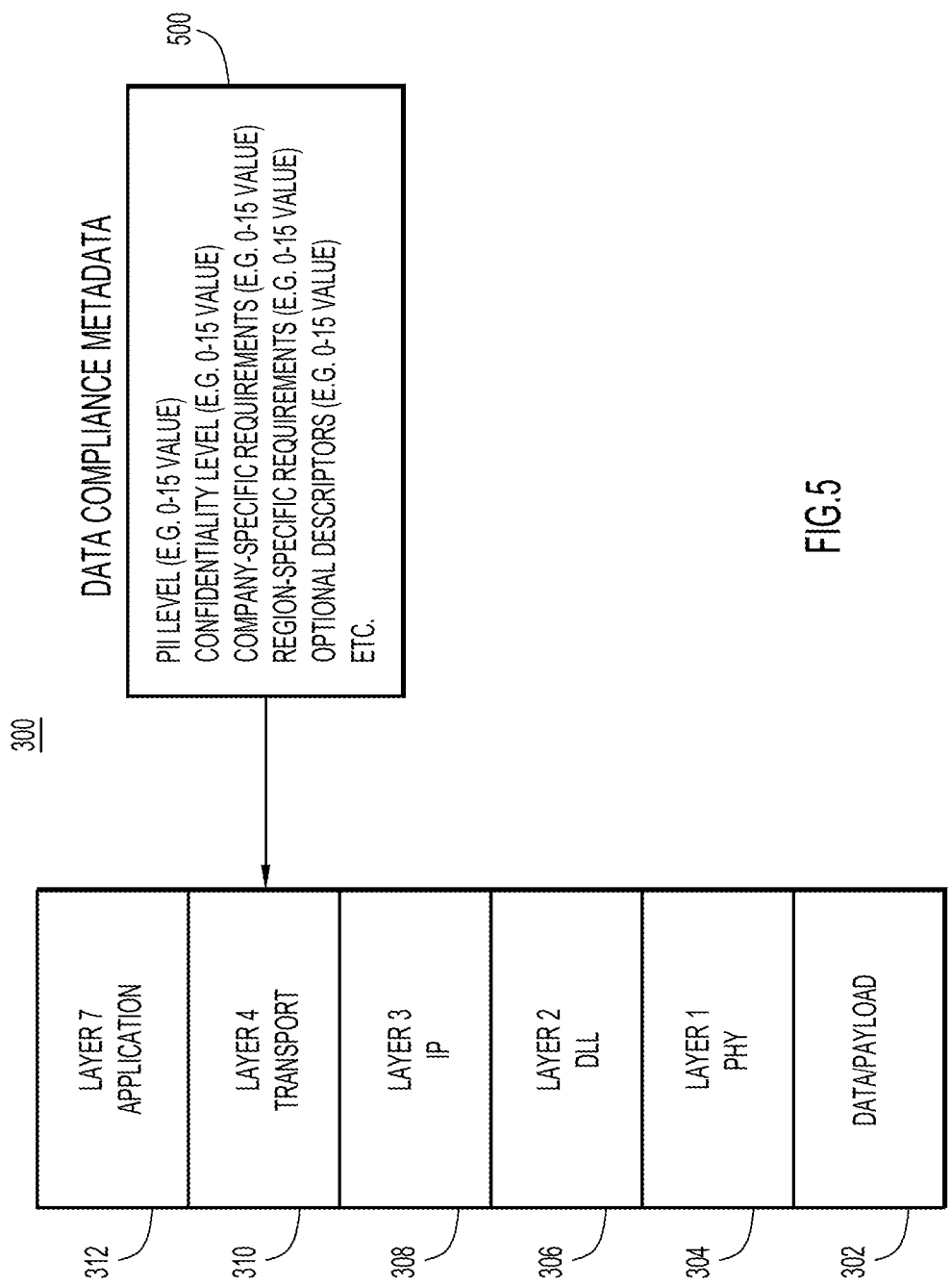
FIG. 5 illustrates how a performance management agent may add data compliance metadata to a Transmission Control Protocol (TCP) header according to an example embodiment.

In another option, the performance management agent could add data compliance metadata 500 to a Transmission Control Protocol (TCP) header via Options Fields, as shown in FIG. 5. While TCP Options Fields are less flexible and extensible as HTTP headers, they present the advantage of remaining unencrypted. Another consideration is that TCP Options Fields (as their very name implies) may or may not be present, and are flexible in length.

Figure 6:
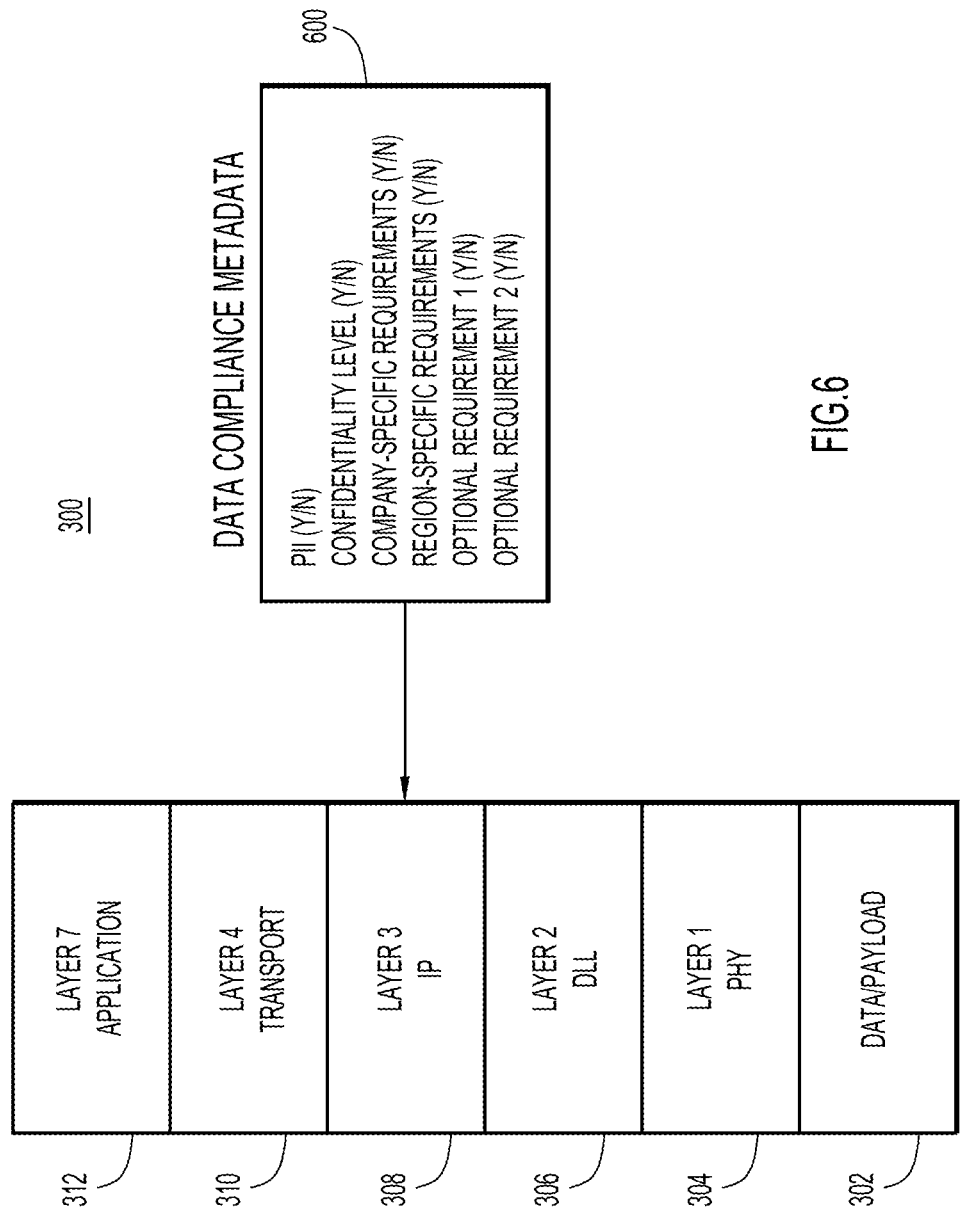
FIG. 6 illustrates how a performance management agent may add data compliance metadata to a Layer 3 (Internet Protocol) header, according to an example embodiment.

In yet another embodiment, the performance management agent could add data compliance metadata 600 into an Internet Protocol (IP) Type of Service (ToS) byte of the Layer 3 header 308, as shown FIG. 6.

There are several advantages to inserting data compliance metadata into the IP ToS byte. The IP ToS byte field is present in all IP packets (IPv4 packets and IPv6 packets). Additionally, the ToS byte field would also be available for User Datagram Protocol (UDP) traffic (as may be utilized by event driven architectures), and not limited to TCP traffic only. The IP ToS byte field is always unencrypted (even if an inner ToS byte is encapsulated and/or encrypted, its value would, by default, always be copied to the outermost IP ToS byte). The position of the IP ToS byte is fixed and (virtually) all network hardware supports the reading of it for network policy enforcement. Another advantage of using the IP ToS byte for marking data compliance relates to network monitoring and operations, as this approach would produce separate IP flows that will vary according to the data compliance requirements, thus making the tracking and tracing of these flows over the network more apparent to network operators.

Specifically, discrete IP flows are produced for each unique combination of the following tuples:
  IP Source Address
  IP Destination Address
  Layer 4 (L4) Protocol (generally TCP or UDP)
  L4 Source Port
  L4 Destination Port
  IP ToS Therefore, using distinct IP ToS values to identify these flows allows network analytics platforms to display how these flows are traversing the network, and thus providing closed loop network assurance of data compliance network policies.

In the IP ToS byte field, 2 bits are reserved for Explicit IP Congestion Notification (IP ECN), leaving 6 bits for Differentiated Services Code Point (DSCP) marking. While 6 bits of DSCP marking provide 64 potential code points for use, 22 code points have already been explicitly defined by the IETF as standard Per Hop Behaviors (PHBs). All IETF-defined DSCP values are even numbers (i.e. no odd-value DSCP assignments exist for standard DSCP interpretations, per existing standards). This fact could be exploited in order to assign certain values to flows to signal various data compliance levels, using odd-numbered DSCP values. Inspection at an intermediate device could simply then inspect the least-significant bit within the DSCP/TOS byte, and if set to 1 (indicating the presence of an odd-valued DSCP), then proceed to interpret the DSCP value as signaling a given data compliance requirement, or levels (if multiple different DSCP values were to be used across various flows).

This would allow for a very efficient implementation in hardware, while still preserving significant flexibility by leveraging multiple odd-value DSCPs to signal multiple data compliance levels. The mapping between the various odd DSCP values and the associated data compliance levels could easily be configured and communicated to devices via a central network controller.

The signaling of the data compliance metadata need not be continuous across the entire lifetime of a flow, but rather could be signaled on only a selected number of designated packets within a flow to establish the data compliance level for that flow, with a subsequent reversion to more "standard" DSCP mapping for QoS purposes. Since no intermediate devices should contain QoS policies referencing odd-value DSCP instances, no issues with queuing would be expected to be observed, with odd-value DSCP packets likely falling through into best-effort data handling in many instances. Again, since this would likely be in effect for only a small subset of packets for an entire flow, no deleterious QoS consequences would be expected to result from such remarking—and in return, a very extensible and capable data compliance marking system could be established and used.

Another IP-layer data-compliance marking option is presented by noting that RFC 2474 specifies two pools of codepoints that may be used for experimental and/or local use (EXP/LU), as detailed in RFC 2474-Section 6. As such, code points from these EXP/LU pools could be used to describe the data within the payload of a packet for network treatment policies for data compliance.

For example, packets carrying Transactional Data traffic are recommended (per RFC 4594) to be marked:
  AF21 (DSCP 18), for Conforming Transactional Data
  AF22 (DSCP 20), for Exceeding Transactional Data
  AF23 (DSCP 22), for Violating Transactional Data In addition to these standards-recommended markings for Transactional Data, additional data compliance metadata could be encapsulated in the IP ToS byte within the existing DSCP framework, where DSCP values 0, 8, 10, 12, 14, 18, 20, 22, 26, 28, 30, 32, 34, 36, 38, 40, 44 and 46 are standards-based Data Plane markings and DSCP values 16, 24, 48 and 56 are standard-based Control Plane markings.

Figure 7:
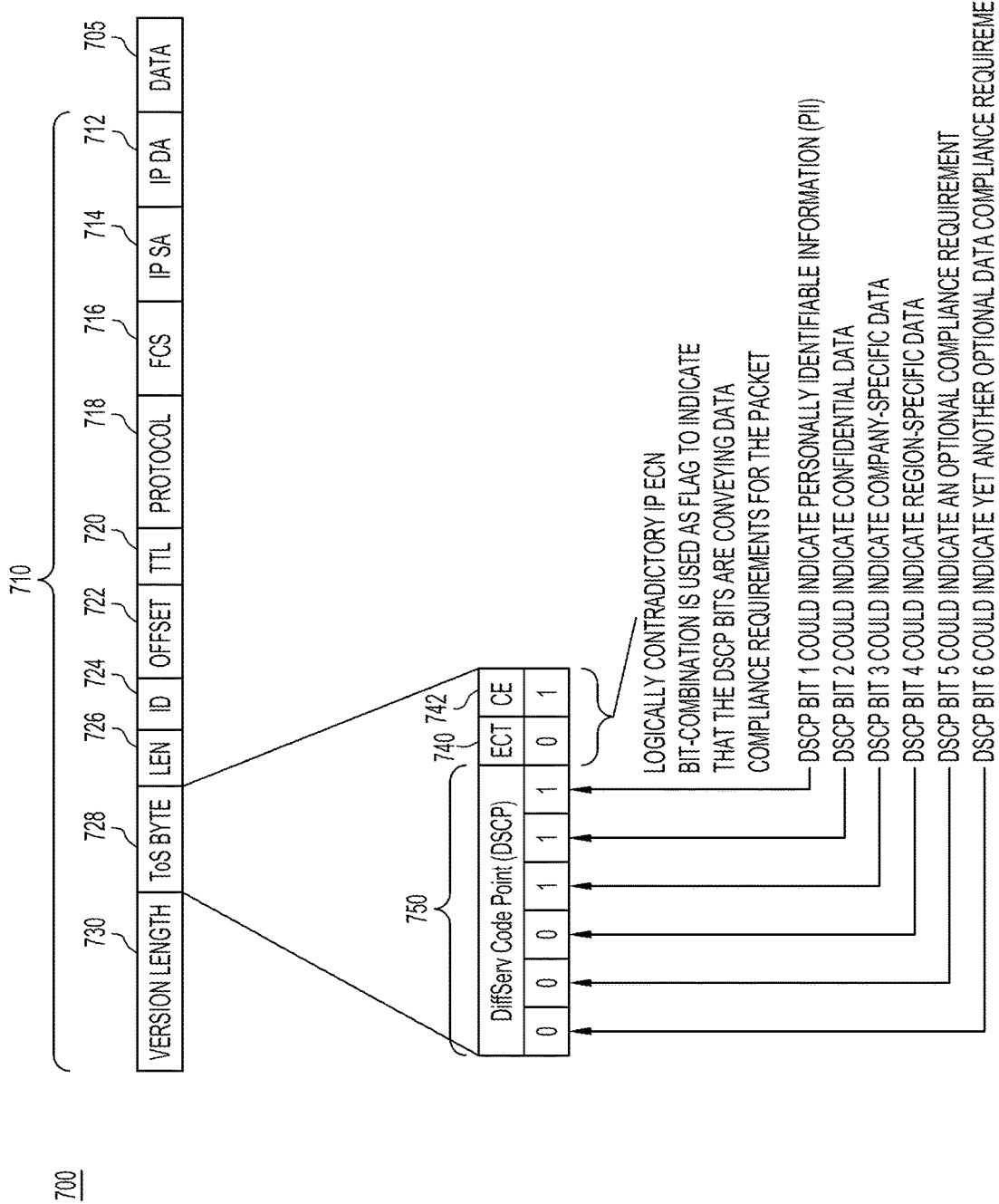
FIG. 7 shows illustrates how data compliance metadata may be encoded in a Type of Service (ToS) byte of an IP header, according to an example embodiment.

Still another approach involves another use of the IP ToS byte, as now described with reference to FIG. 7. FIG. 7 shows a packet 700 (e.g., an IPv4 packet) that includes data/payload 705 and a Layer 3 header 710. The Layer 3 header 710 includes an IP destination address (DA) field 712, IP source address (SA) field 714, frame check sequence (FCS) field 716, Protocol field 718, Time-To-Live (TTL) field 720, Offset field 722, Identifier (ID) field 724, Length (Len) field 726, ToS Byte field 728 and version length field 730.

As previously mentioned, the last 2 bits of the IP ToS Byte are assigned for IP ECN. These are the bits shown at reference numerals 740 and 742. Specifically, these last 2 bits are the ECN Capable Transport (ECT) bit (1=yes; 0=no) and the Congestion Experienced (CE) bit (1=yes; 0=no). The definition of these bits allows for a logically contradictory combination, specifically:
  ECT=0 (i.e. meaning that the transport does NOT support IP ECN) with
  CE=1 (i.e. meaning that Congestion WAS Experienced)

As such, this specific bit-combination (ECT=0 and CE=1) conveys no practical and meaningful information in itself; however, this logically contradictory bit-combination is used as a special flag or indicator, namely an "IP ECN Flag", to indicate that the six DSCP bits shown at reference numeral 750 are conveying data compliance requirements for the packet 700. That is, this IP ECN flag could be interpreted to mean that the DSCP bits preceding these two bits are to be interpreted in a special, locally significant manner, such as to indicate data compliance requirements.

Accordingly, six individual bits can be used to reflect the data compliance requirements of the IP packet; furthermore, these bits could be flexibly toggled to create 64 unique combination of values, as illustrated in FIG. 7. The DSCP field can therefore be repurposed to express the following example data compliance requirements:
   DSCP bit 1 to indicate whether the data includes Personally Identifiable Information (PII)
   DSCP bit 2 to indicate whether the data is Confidential
   DSCP bit 3 to indicate whether the data is Company-Specific
   DSCP bit 4 to indicate whether the data is Region-Specific
   DSCP bit 5 to indicate an optional compliance requirement
   DSCP bit 6 to indicate yet another optional data compliance requirement Setting the special IP ECN flag and the data compliance DSCP bits would not need to be done for every packet, but could be done only for the first and last packets of a given data request; all intermediate packets could be marked normally. Thus, two options exist for network quality of service (QoS) treatment for these flows:
   1. The first and last packets of these flows would receive a predefined treatment; for example, it could be assumed that whenever this IP ECN Flag is set, then the traffic is to be considered Conforming Transactional Data.
   2. The networking equipment hardware could be programmed to recognize these flows as the same flow and continue to apply the same QoS treatment specified before and after the special IP ECN flag was set.

Since virtually every network device in the world can read and set policies on IP ToS byte values, marking packet data compliance requirements would allow for tremendously flexible routing, access, inspection and treatment policies to be enforced across the organization's network.

Figure 8:
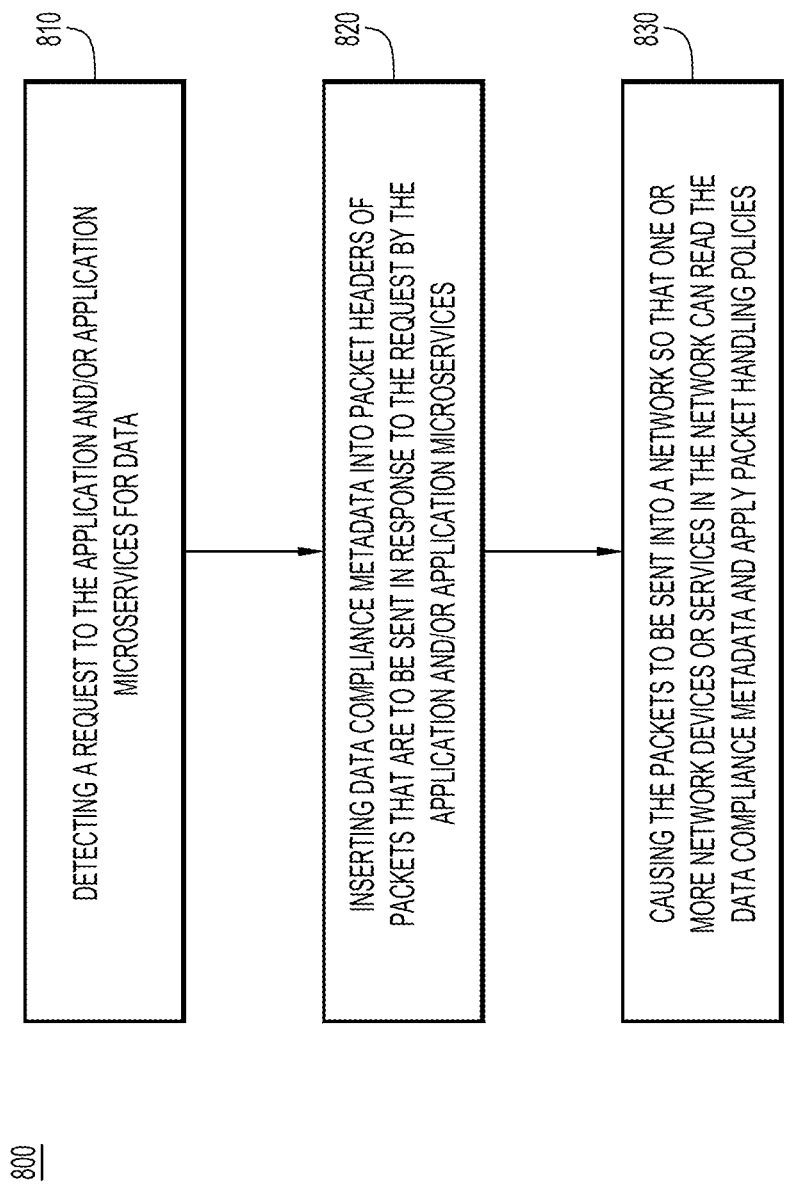
FIG. 8 is a flow chart depicting a method for adding data compliance metadata to packets, according to an example embodiment.

Reference is now made to FIG. 8. FIG. 8 illustrates a flow chart that depicts a method 800 performed using an application performance management agent running on an application and/or application microservices. The method 800 involves, at step 810, detecting a request to the application and/or application microservices for data. At step 820, the method 800 involves inserting data compliance metadata into packet headers of packets that are to be sent in response to the request by the application and/or application microservices. The data compliance metadata may comprise data-compliance markings associated with the data based on user/operator-defined data compliance requirements. In one form, as depicted in FIG. 3, the data compliance metadata may be inserted at one or more of: Layer 3, Layer 4 and Layer 7 of the packet headers of the packets. For example, the data compliance metadata may be inserted in one or more of: Hypertext Transfer Protocol (HTTP) headers at Layer 7, Transmission Control Protocol (TCP) header fields at Layer 4, and Internet Protocol (IP) Type of Service (ToS) bytes at Layer 3. In yet another example, the data compliance metadata may be included in an IP ToS byte that includes Differential Service Code Point (DSCP) bits and explicit congestion notification bits, wherein logically contradicting values of the explicit congestion notification bits are used as a flag to indicate that the DSCP bits are conveying data compliance metadata for a given packet of the packets At step 830, the method 800 includes causing the packets to be sent into a network so that one or more network devices or services in the network can read the data compliance metadata and apply packet handling policies. In one example, the packet handling policies are regional or organization-specific policies.

As described above in connection with FIGS. 1 and 2, step 820 of inserting data compliance metadata may be based on operator-defined data compliance requirements for the data that is provided in response to the request. In that case, the method 800 may further include receiving operator-input that sets the data compliance requirements for data served by the application and/or application microservices.

Furthermore, the method 800 may further include using the application performance management agent, capturing details of individual transactions within the application and/or application microservices to provide visibility into data compliance requirements for an individual transaction.

In summary, an application performance monitoring agent is used, instead of generating application performance telemetry, to detect and enforce packet marking policies for specific types of data requests to indicate data compliance requirements. In one example, an IP ToS byte is used to carry the data compliance data using a logically-contradictory combination of the IP ECN bits to indicate that the preceding DSCP bits are not to be interpreted (as is generally the case) for quality of service treatment purposes, but rather, as data compliance requirements for the packet.

The application performance monitoring telemetry agent is used to identify data compliance requirements of specific data requests within a given application. The agent is also leveraged to mark packet headers in with metadata to reflect these requirements. With such markings in place, virtually any network device can enforce data compliance policies, including devices or processes that perform routing, access, inspection and treatment operations.

Referring to FIG. 9, FIG. 9 illustrates a hardware block diagram of a computing/computer device 900 that may perform functions of a device (e.g., server computer 210(1) shown in FIG. 2) associated with operations discussed herein in connection with the techniques depicted in FIGS. 1-8. In various embodiments, a computing device, such as computing device 900 or any combination of computing devices 900, may be configured as any devices as discussed for the techniques depicted in connection with FIGS. 1-5 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, mouse, display, a touch screen display, and/or any other suitable input and/or output device now known or hereafter developed. These user input devices may be used by a user to initiate a monitoring session and to specify where the results of the monitoring session are to be delivered, as described above. This may be the case, in particular, when the computing device 900 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computing device 900 serves as a user device as described herein.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to conduct operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc., as discussed for various embodiments described herein may be performed among entities that may directly or indirectly connected utilizing any algorithms, communication protocols, interfaces, etc., (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

In some aspects, the techniques described herein relate to a method performed using an application performance management agent running on an application and/or application microservices, the method including: detecting a request to the application and/or application microservices for data; inserting data compliance metadata into packet headers of packets that are to be sent in response to the request by the application and/or application microservices, the data compliance metadata including data-compliance markings associated with the data based on user/operator-defined data compliance requirements; and causing the packets to be sent into a network so that one or more network devices or services in the network can read the data compliance metadata and apply packet handling policies.

In some aspects, the data compliance metadata is inserted at one or more of: Layer 3, Layer 4 and Layer 7 of the packet headers of the packets.

In some aspects, the data compliance metadata is inserted in one or more of: Hypertext Transfer Protocol (HTTP) headers at Layer 7, Transmission Control Protocol (TCP) header fields at Layer 4, and Internet Protocol (IP) Type of Service (ToS) bytes at Layer 3.

In some aspects, the data compliance metadata is included in an IP ToS byte that includes Differential Service Code Point (DSCP) bits and explicit congestion notification bits, wherein logically contradicting values of the explicit congestion notification bits are used as a flag to indicate that the DSCP bits are conveying data compliance metadata for a given packet of the packets.

In some aspects, the packet handling policies are regional or organization-specific policies.

In some aspects, the packet handling policies include routing control, access control, and packet inspection.

In some aspects, inserting data compliance metadata is based on operator-defined data compliance requirements for the data that is provided in response to the request.

In some aspects, the method further includes: receiving operator-input that sets the data compliance requirements for data served by the application and/or application microservices.

In some aspects, the method further includes: using the application performance management agent, capturing details of individual transactions within the application and/or application microservices to provide visibility into data compliance requirements for an individual transaction.

In some aspects, the techniques described herein relate to an apparatus including: a network interface that enables communications in a network; memory that stores data and program instructions; and one or more hardware processor devices in communication with the network interface and the memory, wherein the one or more hardware processor devices is configured to use an application performance management agent running on an application and/or application microservices to perform a method including: detecting a request to the application and/or application microservices for data; inserting data compliance metadata into packet headers of packets that are to be sent in response to the request by the application and/or application microservices, the data compliance metadata including data-compliance markings associated with the data based on user/operator-defined data compliance requirements; and causing the packets to be sent into a network so that one or more network devices or services in the network can read the data compliance metadata and apply packet handling policies.

In some aspects, the techniques described herein relate to one or more non-transitory computer readable storage media encoded with instructions that, when executed by a processor, cause the processor to perform a method using an application performance management agent running on an application and/or application microservices, the method including: detecting a request to the application and/or application microservices for data; inserting data compliance metadata into packet headers of packets that are to be sent in response to the request by the application and/or application microservices, the data compliance metadata including data-compliance markings associated with the data based on user/operator-defined data compliance requirements; and causing the packets to be sent into a network so that one or more network devices or services in the network can read the data compliance metadata and apply packet handling policies.

In some aspects, the techniques described herein relate to one or more non-transitory computer readable storage media, wherein the data compliance metadata is included in an IP ToS byte that includes Differential Service Code Point (DSCP) bits and explicit congestion notification bits, wherein logically contradicting values of the explicit congestion notification bits are used as a flag to indicate that the DSCP bits are conveying data compliance metadata for a given packet of the packets.

In some aspects, the techniques described herein relate to one or more non-transitory computer readable storage media, wherein inserting data compliance metadata is based on operator-defined data compliance requirements for the data that is provided in response to the request, and the method further includes: receiving operator-input that sets the data compliance requirements for data served by the application and/or application microservices.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed using an application performance management agent running on an application and/or application microservices, the method comprising:
   detecting a request to the application and/or application microservices for data;
   inserting data compliance metadata into packet headers of packets that are to be sent in response to the request by the application and/or application microservices, the data compliance metadata comprising data-compliance markings associated with the data based on user/operator-defined data compliance requirements; and
   causing the packets to be sent into a network so that one or more network devices or services in the network can read the data compliance metadata and apply packet handling policies.

2. The method of claim 1, wherein the data compliance metadata is inserted at one or more of: Layer 3, Layer 4 and Layer 7 of the packet headers of the packets.

3. The method of claim 2, wherein the data compliance metadata is inserted in one or more of: Hypertext Transfer Protocol (HTTP) headers at Layer 7, Transmission Control Protocol (TCP) header fields at Layer 4, and Internet Protocol (IP) Type of Service (ToS) bytes at Layer 3.

4. The method of claim 3, wherein the data compliance metadata is included in an IP ToS byte that includes Differential Service Code Point (DSCP) bits and explicit congestion notification bits, wherein logically contradicting values of the explicit congestion notification bits are used as a flag to indicate that the DSCP bits are conveying data compliance metadata for a given packet of the packets.

5. The method of claim 1, wherein the packet handling policies are regional or organization-specific policies.

6. The method of claim 1, wherein the packet handling policies include routing control, access control, and packet inspection.

7. The method of claim 1, wherein inserting data compliance metadata is based on operator-defined data compliance requirements for the data that is provided in response to the request.

8. The method of claim 7, further comprising:
receiving operator-input that sets the data compliance requirements for data served by the application and/or application microservices.

9. The method of claim 1, further comprising:
using the application performance management agent, capturing details of individual transactions within the application and/or application microservices to provide visibility into data compliance requirements for an individual transaction.

10. An apparatus comprising:
a network interface that enables communications in a network;
memory that stores data and program instructions; and
one or more hardware processor devices in communication with the network interface and the memory, wherein the one or more hardware processor devices is configured to use an application performance management agent running on an application and/or application microservices to perform a method including:
detecting a request to the application and/or application microservices for data;
inserting data compliance metadata into packet headers of packets that are to be sent in response to the request by the application and/or application microservices, the data compliance metadata comprising data-compliance markings associated with the data based on user/operator-defined data compliance requirements; and
causing the packets to be sent into a network so that one or more network devices or services in the network can read the data compliance metadata and apply packet handling policies.

11. The apparatus of claim 10, wherein the data compliance metadata is inserted at one or more of: Layer 3, Layer 4 and Layer 7 of the packet headers of the packets.

12. The apparatus of claim 11, wherein the data compliance metadata is inserted in one or more of: Hypertext Transfer Protocol (HTTP) headers at Layer 7, Transmission Control Protocol (TCP) header fields at Layer 4, and Internet Protocol (IP) Type of Service (ToS) bytes at Layer 3.

13. The apparatus of claim 12, wherein the data compliance metadata is included in an IP ToS byte that includes Differential Service Code Point (DSCP) bits and explicit congestion notification bits, wherein logically contradicting values of the explicit congestion notification bits are used as a flag to indicate that the DSCP bits are conveying data compliance metadata for a given packet of the packets.

14. The apparatus of claim 10, wherein the packet handling policies are regional or organization-specific policies and include routing control, access control, and packet inspection.

15. The apparatus of claim 10, wherein inserting data compliance metadata is based on operator-defined data compliance requirements for the data that is provided in response to the request.

16. The apparatus of claim 15, wherein the method further includes:
receiving operator-input that sets the data compliance requirements for data served by the application and/or application microservices.

17. One or more non-transitory computer readable storage media encoded with instructions that, when executed by a processor, cause the processor to perform a method using an application performance management agent running on an application and/or application microservices, the method comprising:
detecting a request to the application and/or application microservices for data;
inserting data compliance metadata into packet headers of packets that are to be sent in response to the request by the application and/or application microservices, the data compliance metadata comprising data-compliance markings associated with the data based on user/operator-defined data compliance requirements; and
causing the packets to be sent into a network so that one or more network devices or services in the network can read the data compliance metadata and apply packet handling policies.

18. The one or more non-transitory computer readable storage media of claim 17, wherein the data compliance metadata is inserted in one or more of: Hypertext Transfer Protocol (HTTP) headers at Layer 7, Transmission Control Protocol (TCP) header fields at Layer 4, and Internet Protocol (IP) Type of Service (ToS) bytes at Layer 3.

19. The one or more non-transitory computer readable storage media of claim 18, wherein the data compliance metadata is included in an IP ToS byte that includes Differential Service Code Point (DSCP) bits and explicit congestion notification bits, wherein logically contradicting values of the explicit congestion notification bits are used as a flag to indicate that the DSCP bits are conveying data compliance metadata for a given packet of the packets.

20. The one or more non-transitory computer readable storage media of claim 17, wherein inserting data compliance metadata is based on operator-defined data compliance requirements for the data that is provided in response to the request, and the method further comprises:
receiving operator-input that sets the data compliance requirements for data served by the application and/or application microservices.

* * * * *